(12) United States Patent
Pereira et al.

(10) Patent No.: US 10,946,906 B2
(45) Date of Patent: Mar. 16, 2021

(54) ROOF FAIRING WITH MOVEABLE PANELS

(71) Applicant: SABIC GLOBAL TECHNOLOGIES B.V., Bergen op Zoom (NL)

(72) Inventors: Carlos Pereira, Putnam Valley, NY (US); Max Ulysses Morton, Averill Park, NY (US); Matthew Douglas Marks, White Lake, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 28 days.

(21) Appl. No.: 16/340,782

(22) PCT Filed: Oct. 13, 2017

(86) PCT No.: PCT/US2017/056613
§ 371 (c)(1),
(2) Date: Apr. 10, 2019

(87) PCT Pub. No.: WO2018/071830
PCT Pub. Date: Apr. 19, 2018

(65) Prior Publication Data
US 2020/0047823 A1 Feb. 13, 2020

Related U.S. Application Data

(60) Provisional application No. 62/408,649, filed on Oct. 14, 2016.

(51) Int. Cl.
*B62D 35/00* (2006.01)
*B62D 37/02* (2006.01)

(52) U.S. Cl.
CPC .......... *B62D 35/001* (2013.01); *B62D 37/02* (2013.01)

(58) Field of Classification Search
CPC .............................. B62D 35/001; B62D 37/02
(Continued)

(56) References Cited

U.S. PATENT DOCUMENTS 3,695,673 A * 10/1972 Meadows ............ B62D 35/001
296/180.2
4,957,325 A * 9/1990 Engel ................... B62D 35/001
296/180.2
(Continued)

FOREIGN PATENT DOCUMENTS

CN 1891556 A 1/2007
CN 101045469 A 10/2007
(Continued)

OTHER PUBLICATIONS

International Patent Application No. PCT/US2017/056613; Int'l Search Report and the Written Opinion; dated Jan. 25, 2018; 13 pages.
(Continued)

*Primary Examiner* — Joseph D. Pape
(74) *Attorney, Agent, or Firm* — Cantor Colburn LLP

(57) ABSTRACT

A fairing configured to be positioned on a roof of a vehicle. The fairing has a forward end and a rearward end. The fairing comprises a flow controlling outer body defining a central forward opening. The fairing includes at least one actuatable panel movably coupled to the flow controlling outer body and a central body aligned with the central forward opening of the flow controlling outer body. At least one air channel open to the central forward opening that extends between the at least one actuatable panel and the central body. The fairing includes at least one actuator configured to move the at least one actuatable panel through a plurality of positions to direct an air flow along at least one
(Continued)

of 1) the at least one air channel and 2) an outboard side of the at least one actuatable panel.

17 Claims, 8 Drawing Sheets

(58) Field of Classification Search
USPC .......................................... 296/180.3, 180.5
See application file for complete search history.

(56) References Cited

U.S. PATENT DOCUMENTS

| | | | |
|---|---|---|---|
| 5,340,190 A * | 8/1994 | Engel | B62D 35/001 |
| | | | 296/180.1 |
| 5,522,637 A | 6/1996 | Spears | |
| 5,536,062 A | 7/1996 | Spears | |
| 2011/0241377 A1 * | 10/2011 | Rogers | B62D 35/001 |
| | | | 296/180.3 |

FOREIGN PATENT DOCUMENTS

| | | |
|---|---|---|
| GB | 2529675 A | 3/2016 |
| WO | WO 2016/077669 A1 | 5/2016 |

OTHER PUBLICATIONS

International Patent Application No. PCT/US2017/056613; Int'l Preliminary Report on Patentability; dated Apr. 25, 2019; 9 pages.

* cited by examiner

ROOF FAIRING WITH MOVEABLE PANELS

CROSS-REFERENCE TO RELATED APPLICATION

This application is the National Stage of International Application No. PCT/US2017/056613, filed Oct. 13, 2017, which claims the benefit of U.S. Provisional Application No. 62/408,649 filed Oct. 14, 2016, the disclosures of which are incorporated herein by this reference in their entireties.

TECHNICAL FIELD

The present disclosure relates to a roof fairing with movable panels that control air flow.

BACKGROUND

Vehicle original equipment manufacturers and fleet owners are continually looking for solutions to improve vehicle mileage and decrease harmful emissions. Regulations are currently being drafted worldwide that will enforce the further reduction of vehicle emissions. Solutions that can improve vehicle mileage and reduce vehicle emissions are continually desired.

SUMMARY

Roof fairings may be used to reduce aerodynamic drag on a tractor-trailer. The effectiveness of roof fairings is dependent on the direction that crosswinds impinge the fairing when the truck is in motion. In use, crosswinds acting on the tractor-trailer may change direction and/or the tractor-trailer could change direction relative to the crosswinds. Typical roof fairings may create high-pressure zones at the left upper end of the trailer or the right upper end of the trailer based on whether crosswinds impinge the fairing more from the left side of the truck or the right side of the truck, respectively. There is a need to adjust the aerodynamics of fairings based on driving conditions and/or direction of crosswinds. Adjustment of such aerodynamics could reduce drag, improving vehicle mileage and reducing emissions. Accordingly, an aspect of the present disclosure is roof fairing for a vehicle. The roof fairing has a forward end and a rearward end and includes a flow controlling outer body defining a central forward opening. The roof fairing has at least one actuatable panel movably coupled to the flow controlling outer body. The roof faring also includes a central body aligned with the central forward opening of the flow controlling outer body and at least one air channel open to the central forward opening and that extends between the at least one actuatable panel and the central body. The fairing has at least one actuator configured to move the at least one actuatable panel through a plurality of positions to direct an air flow along at least one of 1) the at least one air channel and 2) an outboard side of the at least one actuatable panel.

FIGURES

The foregoing summary, as well as the following detailed description of illustrative aspects of the present application, will be better understood when read in conjunction with the appended drawings. For the purposes of illustrating the present application, there is shown in the drawings illustrative aspects of the disclosure. It should be understood, however, that the application is not limited to the precise arrangements and instrumentalities shown.

DETAILED DESCRIPTION

Figure 1:
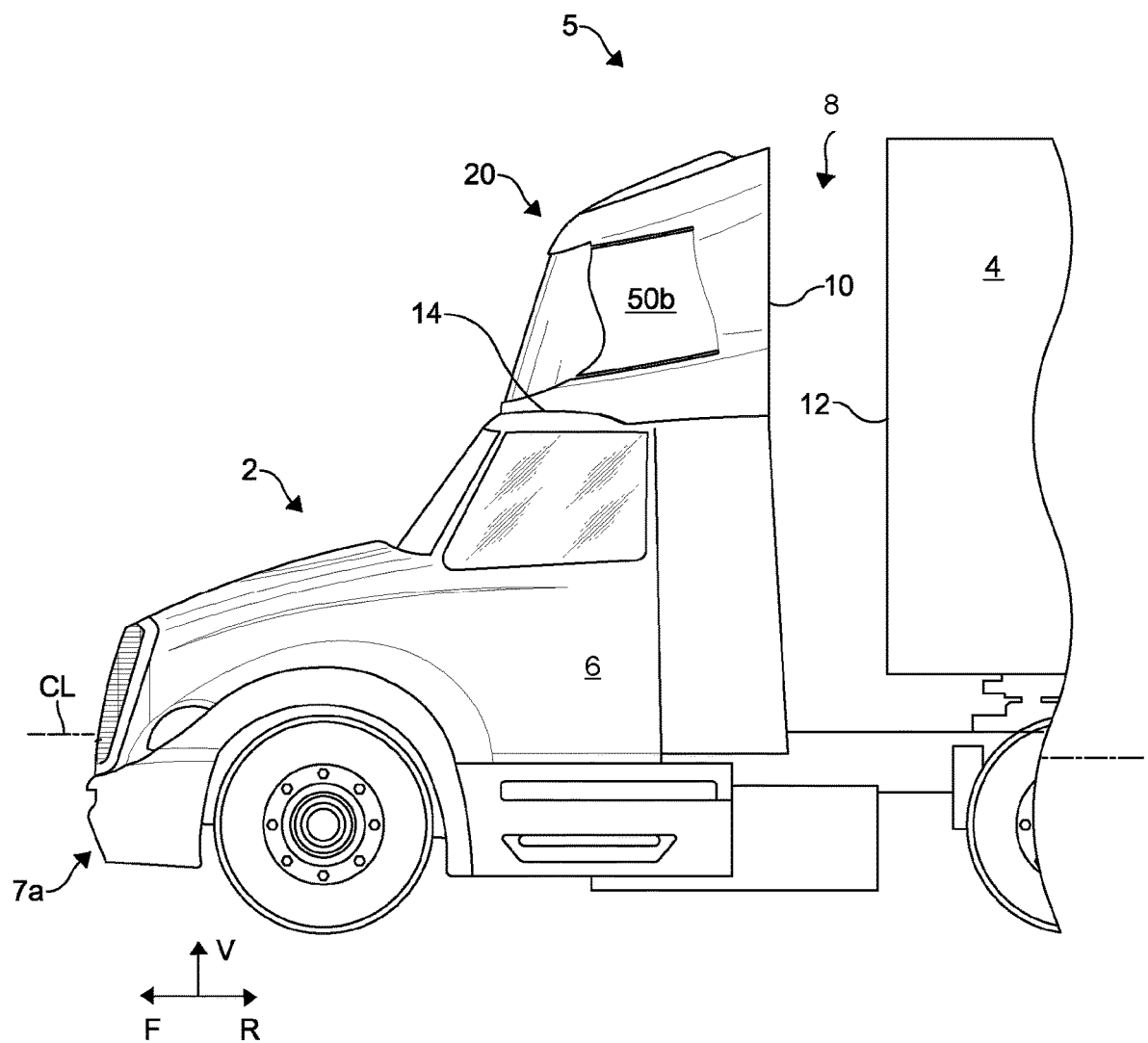
FIG. 1 is a side view of a portion tractor-trailer including a fairing according to an aspect of the present disclosure.

Aspects of the present disclosure include a fairing 20 designed to actively control air flows in and around the vehicle, such as a truck 2 as shown in FIG. 1. Referring to FIG. 1, a fairing 20 is configured for placement onto a roof 14 of a truck 2 adapted to tow a cargo trailer 4. The truck 2 has a cab 6 and a fifth wheel (not numbered) that is used to secure the trailer 4 to the truck 2. The truck 2 and the trailer 4 are sometimes referred to as a tractor-trailer 5. A tractor-trailer 5 creates a gap 8 that extends from a rearward end 10 of the cab 6 to the forward end 12 of the trailer 4.

Figure 2:
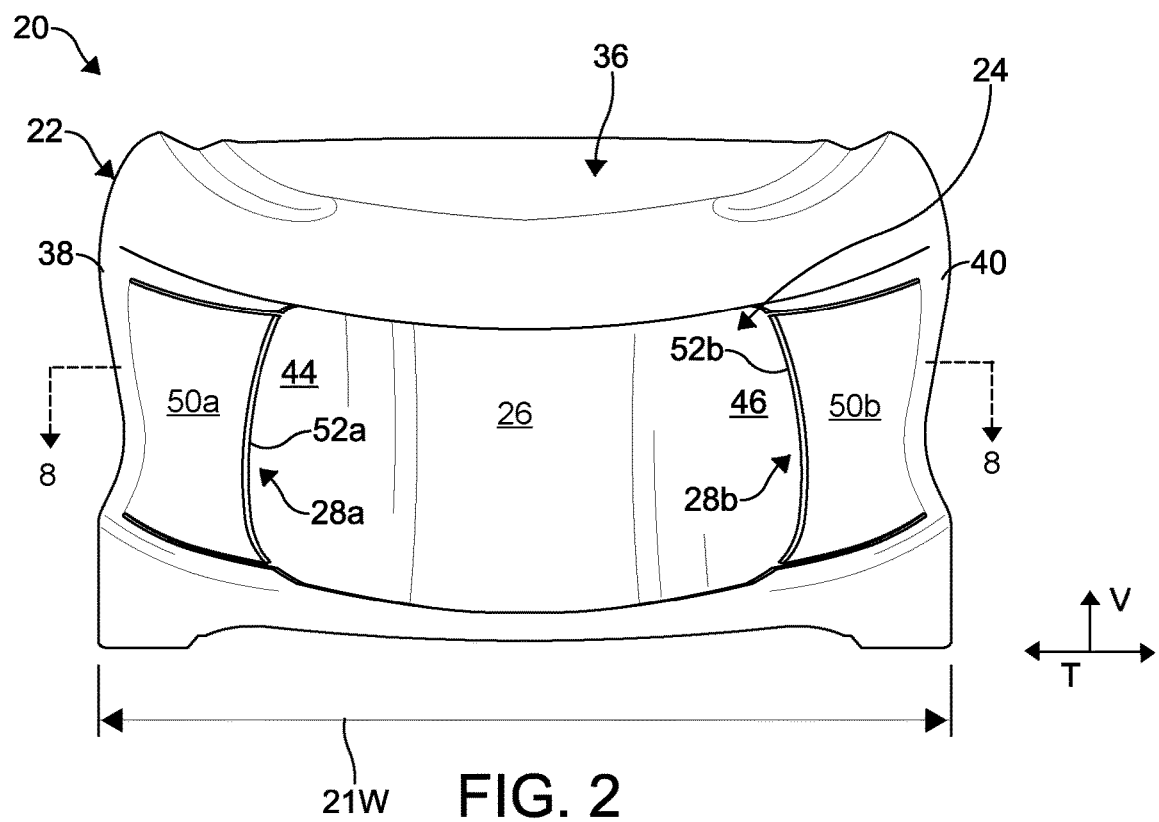
FIG. 2 is a front elevation view of the fairing illustrated in FIG. 1.

Referring to FIGS. 1 and 2, the fairing 20 may include one or more actuatable panels that can be moved into different positions in response to head and/or cross-winds impinging the truck 2. For example, the fairing may include a first actuatable panel 50a and a second actuatable panel 50b. Movement of the actuatable panels 50a, 50b can direct air flow around and/or through the fairing 20 to deflect air flow around and/or across the gap 8. The improved air flow around and/or across the gap 8 may reduce pressure at the forward end 12 of the trailer 4, which in turn, reduces aerodynamic drag. In this instance, aerodynamic drag can be described as the retarding force acting on the tractor-trailer 5 moving through air parallel and opposite to the direction of motion. Contributors to aerodynamic drag of the tractor-trailer 5 can include stagnation pressures at a front end, turbulent in-flows at the gap 8, underside flows, wake at a rear of the trailer 4, and the like. Accordingly, better control of airflows around the fairing 20 may reduce aerodynamic drag.

Improved aerodynamic air flows over a vehicle and its components have long been assumed to yield advancements in vehicle fuel efficiency. It can be difficult, however, to improve vehicle mileage (e.g., through improved fuel economy) and emissions. Increasing vehicle miles per gallon and reducing vehicle emissions can be advantageous in terms of lowering operating costs and complying with emission and fuel economy regulatory requirements. For example, a model Class 8 tractor-trailer can weigh up to approximately 37,000 kilograms (kg) (approximately 80,000 pounds) and can have a wind averaged drag coefficient (Co) of approximately 0.60. At a highway speed of 65 miles per hour (mph) (104.6 kilometers per hour (kph)), about 65% of the total energy expended goes to overcome the aerodynamic drag. Hence, fuel savings and cost of operating a truck can be optimized by improving aerodynamic performance by reducing aerodynamic drag. The fairings as described herein may reduce aerodynamic drag on the truck 2 by optimizing the aerodynamics of the fairing in use, which in turn, can increase fuel economy and reduce emissions.

Referring back to FIG. 1, the fairing 20 is positioned on the roof 14 of the truck 2 and deflects air across the gap 8 when the truck 2 is in motion. The truck 2 has a front 7a and a rear (not shown) spaced from the front 7a along a forward-rearward direction FR. As used herein, a forward-rearward direction FR includes a forward direction F, which is a direction toward the front 7a of the truck 2 from a given point of reference. The forward-rearward direction FR also includes a rearward direction R, which is a direction toward the rear of the truck 2 from a given point of reference. The truck 2 has a height (not shown) that extends along a vertical direction V that is perpendicular to the forward-rearward direction FR. The truck 2 has a width (not shown) that extends along a transverse direction T that is perpendicular to the vertical direction V and the forward-rearward direction FR. The directional components described above for the truck 2 apply to various aspects of the fairings described herein. Accordingly, the forward-rearward direction FR, vertical direction V, and transverse direction T are directional components used to describe and illustrate fairings and their components.

The direction of air flow or winds impinging the truck is referred to herein as the yaw direction. As used herein, the yaw direction is a degree of offset with respect to the truck centerline CL (see FIGS. 1 and 4) that is horizontal to the road surface. A "0° yaw" is aligned with the truck centerline CL. A positive yaw angle indicates a direction offset toward the right of the centerline CL. A negative yaw angle indicates a direction offset toward the left of the centerline CL. As used herein, "left" is the left side of the forward direction of travel, e.g. the driver's side of the truck. In addition, "right" is the right side of the forward direction of travel, e.g. the passenger side of the truck. Typically, the yaw direction of wind imping the truck 2 will vary between plus or minus 12° with respect to the centerline CL of the truck 2.

Referring to FIGS. 2-5, the fairing 20 has a front portion 21F and a rearward portion 21R that is rearward of the front portion 21F along the forward-rearward direction FR. The rearward portion 21R has a generally larger width 21W and height 21H than the front portion 21F. As illustrated, the width 21W and height 21H gradually increase along the forward-rearward direction FR to define a streamlined fairing profile for directing air flow across and around the gap 8 when the truck 2 (FIG. 1) is in motion.

As shown in FIGS. 2-5, the fairing 20 has an outer body 22, one or more actuatable panels 50a, 50b movably coupled to the outer body 22, a central body 26 within the outer body 22 disposed between the actuatable panels 50a, 50b, and one or more air channels 28a, 28b between the actuatable panels 50a, 50b and the central body 26. In accordance with the illustrated aspect of the present disclosure, the fairing 20 includes a first actuatable panel 50a and a second actuatable panel 50b. The first actuatable panel 50a may be referred to sometimes as the right actuatable panel 50a. The second actuatable panel 50b may be referred to sometimes as the left actuatable panel 50b. As discussed above, "left" and "right" refer to the driver side and a passenger side of the vehicle, respectively. A control system 70 (FIG. 8) is configured to move actuatable panels 50a, 50a to selectively deflect air flow through the air channels 28a, 28b and/or around sides the fairing 20. Movement of the actuatable panels 50a, 50b is in response to the direction and, in some instances the velocity, of headwinds and/or crosswinds acting on the truck 2 when the truck is in forward motion. The fairing 20 may optionally include brackets (not shown) attached to the outer body 22 that may be used to secure the fairing 20 to the roof 14 of the truck 2. Any suitable mechanical fastener can be used to secure the fairing the truck 2. In other aspects, the fairing 20 may be secured to the roof 14 of the truck to utilizing adhesives. In other aspects, the fairing 20 may be formed as part of the roof 14 of the truck.

Figure 3:
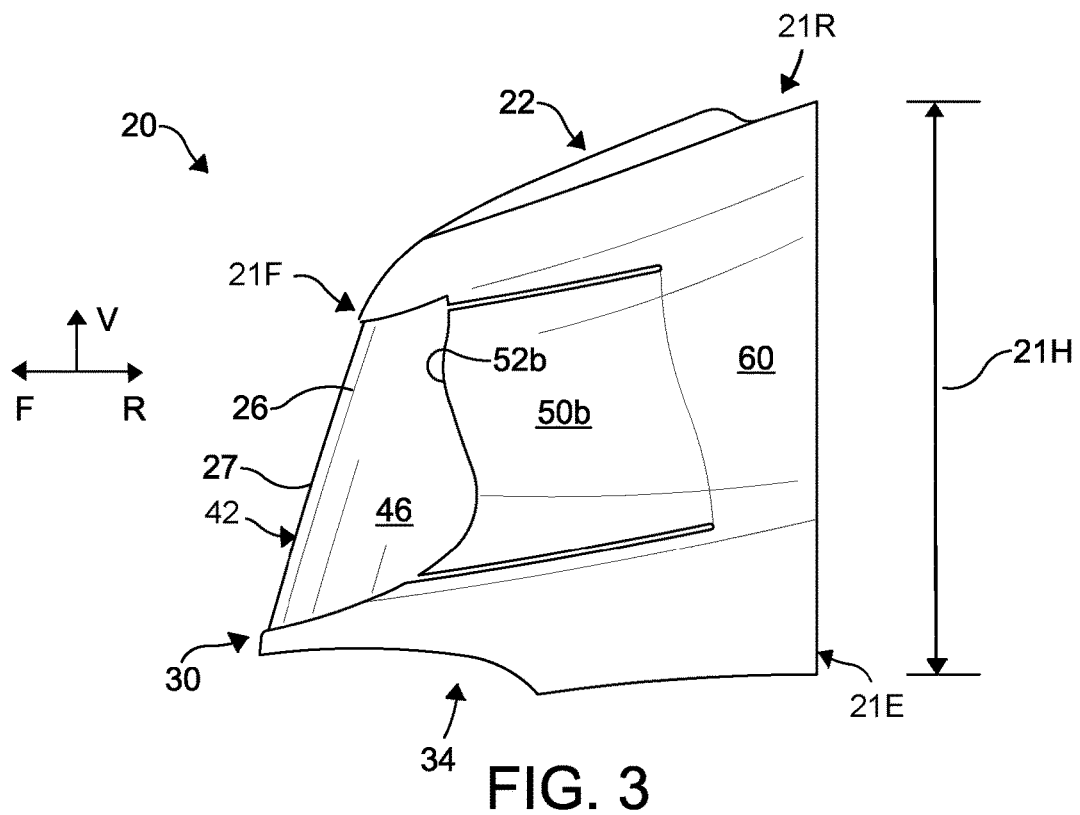
FIG. 3 is a side elevation view of the fairing illustrated in FIG. 1.

Referring to FIGS. 2 and 3, the outer body 22 has a forward end 30 and a rearward end 32 opposite the forward end 30 along the forward-rearward direction FR. The fairing has a base 34 for placement on the roof 14 of the truck 2, a forward portion that extends from the forward end 30 to a top 36. The front of the outer body 22 defines a central forward opening 24 that extends between the base 34, the top 36, and first and second terminal ends 52a, 52b of the first and second actuatable panels 50a, 50b, respectively. The rearward end 32 of the outer body 22 defines a first side 38 and a second side 40 opposite to the first side 38 along the transverse direction T and spaced apart a width 21W. The first actuatable panel 50a and the second actuatable panel 50b may be movable, e.g. pivotably, coupled to the first side 38 and the second side 40, respectively. In one aspect, the first actuatable panel 50a and the second actuatable panel 50b may include hinges, pivots, movable joints, and the like to provide rotation and movement thereabout.

Figure 4:
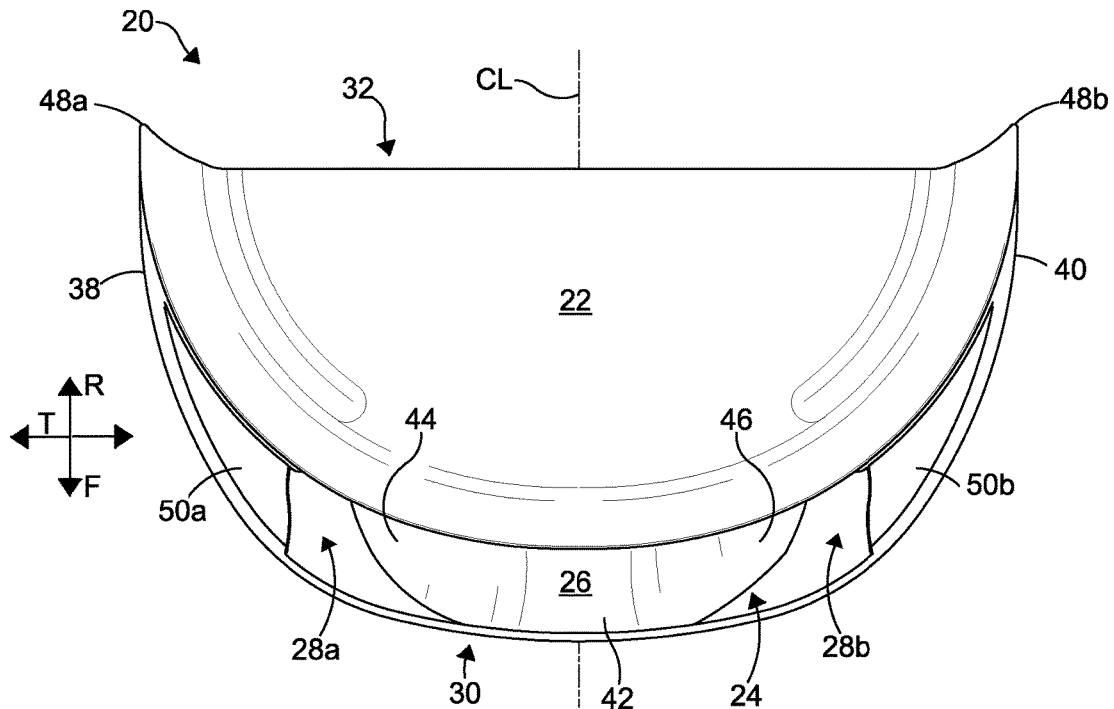
FIG. 4 is a top plan view of the fairing illustrated in FIG. 1.
Figure 5:
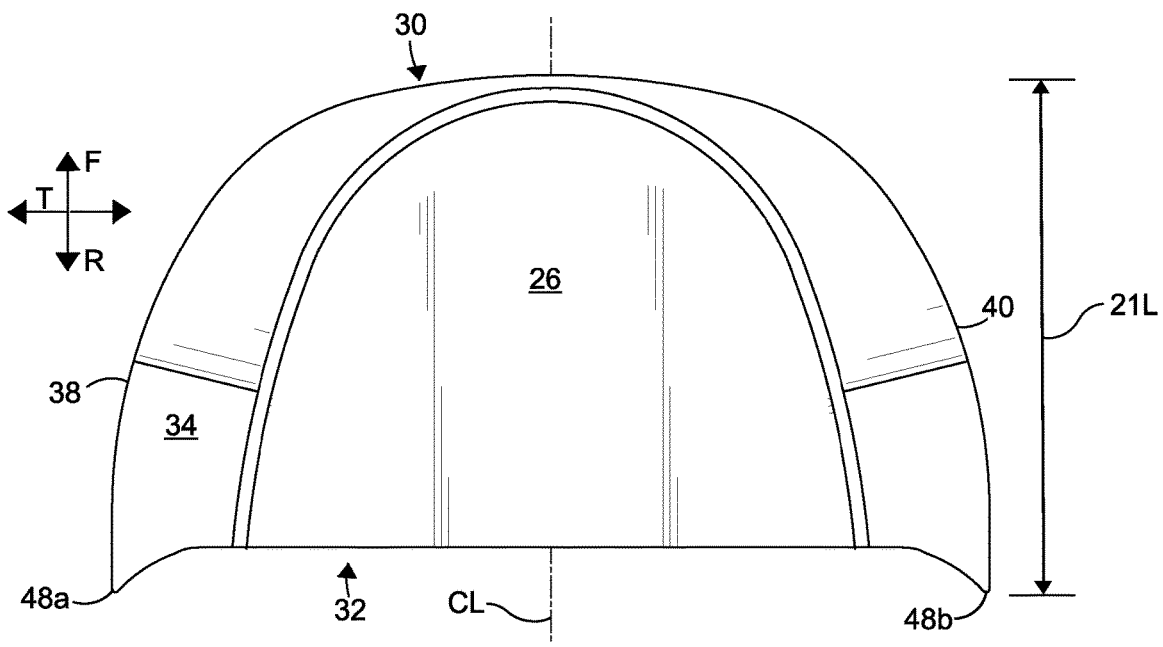
FIG. 5 is a bottom plan view of the fairing illustrated in FIG. 1.

Referring to FIGS. 4 and 5, the fairing 20 may be sized to cover a substantial portion of the roof 14 of the truck 2 (FIG. 1). The base 34 of the outer body 22 defines a footprint having a fairing length 21L that extends from the forward end 30 to the rearward end 32 along the forward-rearward direction FR. The fairing also has a fairing width 21W that extends from the first side 38 to the second side 40 along the transverse direction T. The fairing length 21L may be less than the fairing width 21W. In one example, the fairing length 21L is between 1.0 m and about 2.4 m. In one example, the fairing width 21W may be slightly less than a width of a typical roof of a truck 2. The term "about" used in connection with a distance means plus or minus 5% of the referenced distance.

Referring to FIGS. 2 and 4, the central body 26 is disposed in an inner space of the outer body 22. The central body 26 is aligned with the central forward opening 24 along the forward-rearward direction FR and is positioned between the first and second actuatable panels 50a, 50b. The central body 26 has a forward end 42 that is aligned with the central forward opening 24, and first and second side walls 44 and 46 that extend from the forward end 42 in a rearward direction R. The first side wall 44 and the second side wall 46 are spaced inboard of the first side 38 and the second side 40 of the outer body 22, respectively. The forward end 42 has a more narrow width than the rearward end 43. Furthermore, the forward end 42 of the central body 26 inclines rearwardly and upwardly away from the base 34 of the outer body 22 toward the top of the outer body 22. Thus, the forward end 42 of the central body at least partially defines an inclined forward portion 27 and outwardly tapered portions of side walls 44 and 46. The inclined forward portion 27 and tapered portions of side walls 44 and 46 direct air flows entering the central forward opening 24 toward the lateral-most edges 48a and 48b of the outer body 22.

Figure 6:
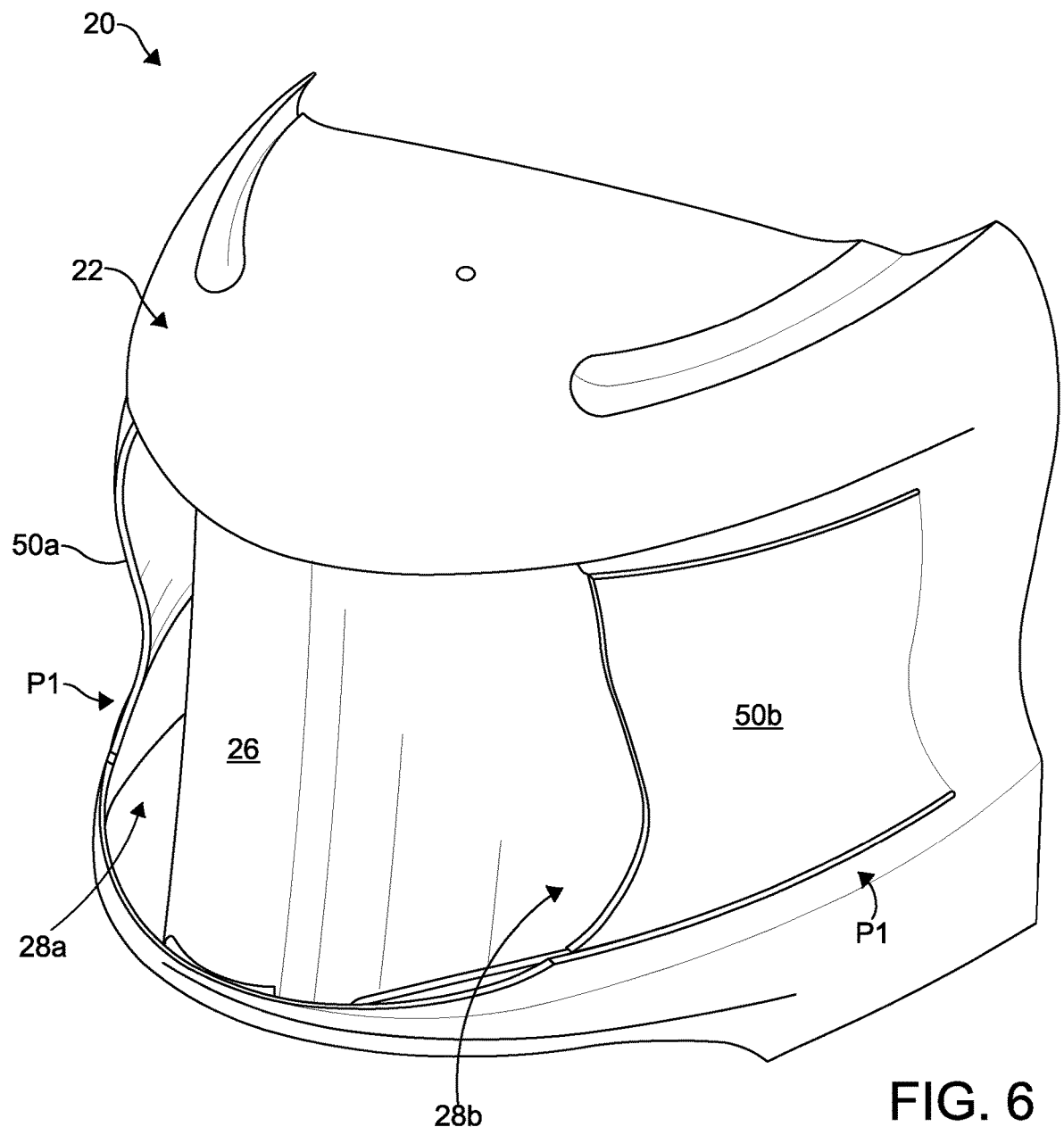
FIG. 6 is a top perspective view of the fairing illustrated in FIG. 1.
Figure 7A:
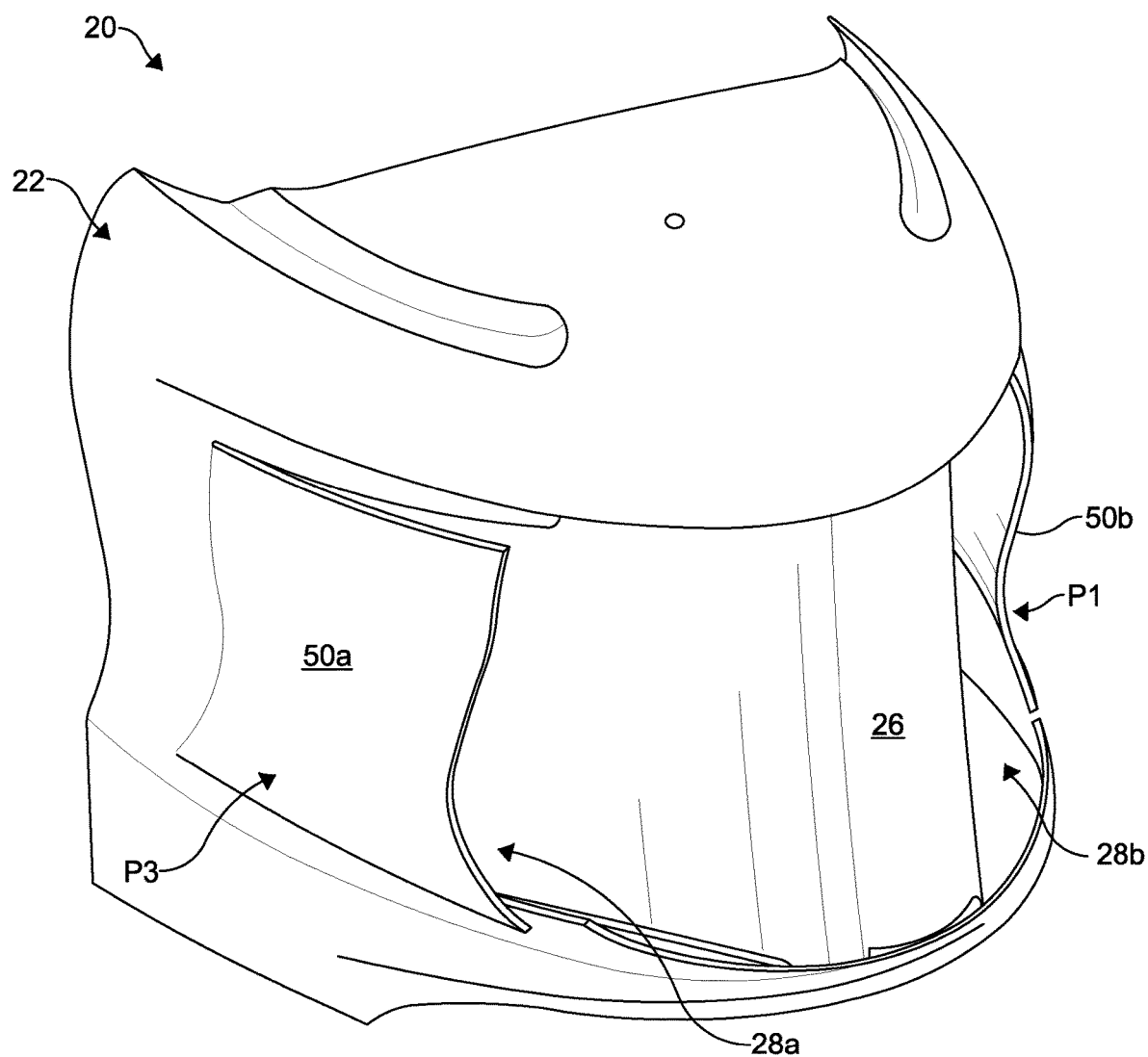
FIGS. 7A and 7B are top perspective views of the fairing illustrated in FIG. 6, illustrating a panel in an open position to direct air flow into an air channel.
Figure 7B:
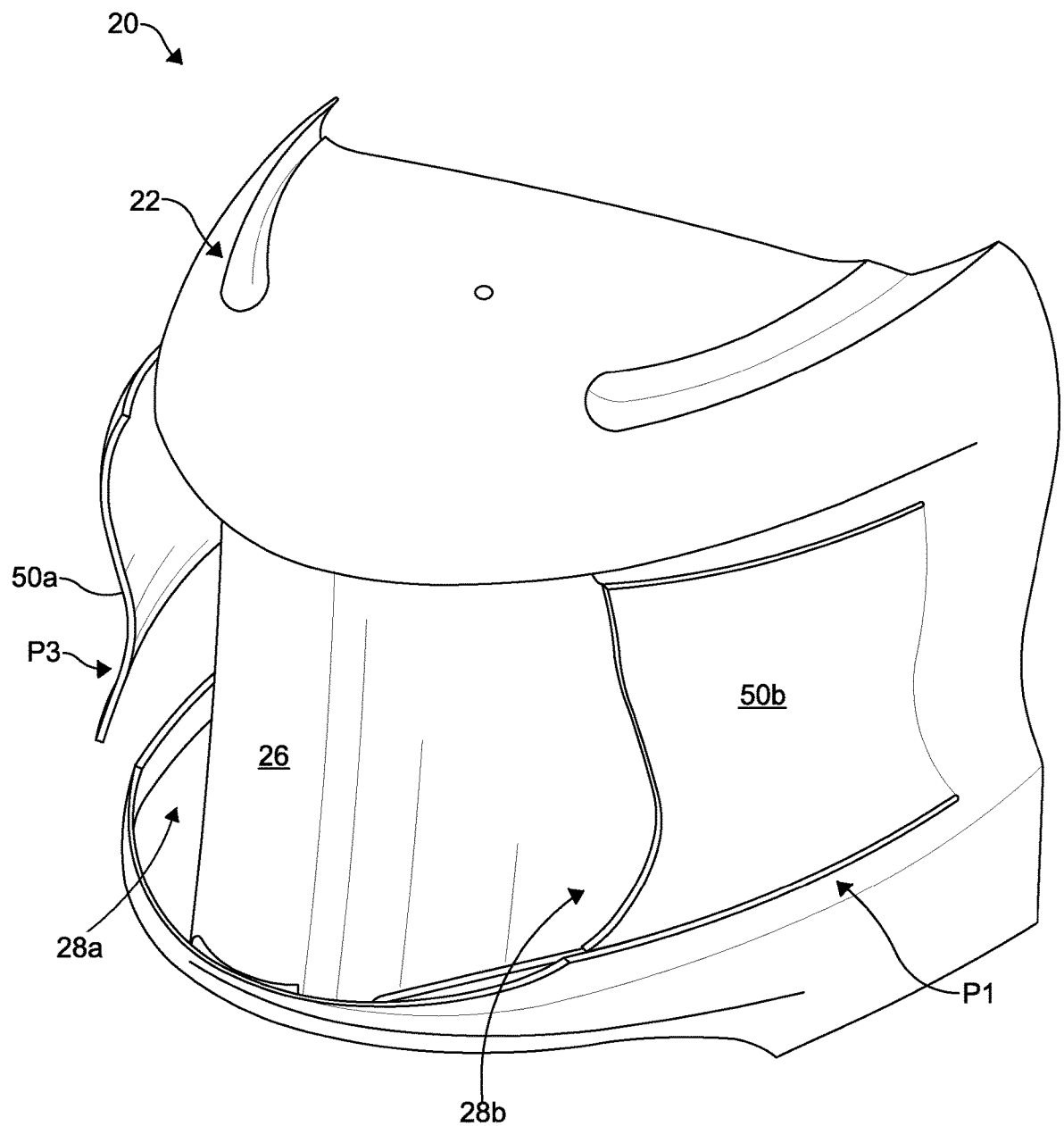
Figure 8:
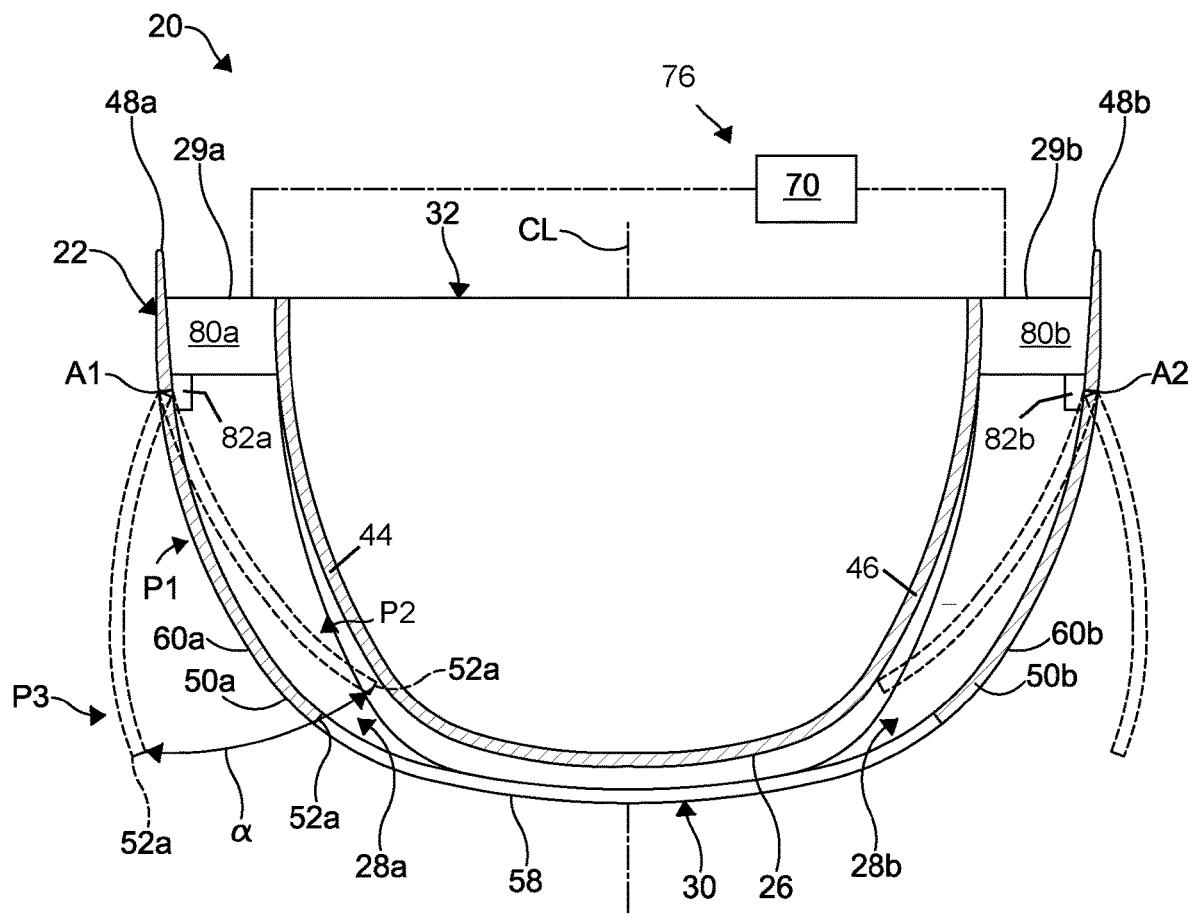
FIG. 8 is a cross-sectional view of the fairing taken along line 8-8 in FIG. 3.

As shown in FIGS. 6-8, the fairing 20 includes at least one air channel 28a, 28a to direct the flow of air through the fairing 20 and across the gap 8. For example, in one aspect, the fairing 20 includes a first air channel 28a and a second air channel 28b. The first air channel 28a guides air flow between the first actuatable panel 50a and the first side wall 44 of the central body 26 to a first air channel outlet 29a (FIG. 8). The first air channel outlet 29a is proximate with the first lateral edge 48a. The second air channel 28b guides air flow between the second actuatable panel 50b and the second side wall 46 of the central body 26 to a second air channel outlet 29b (FIG. 8). The second air channel outlet 29b is proximate the lateral edge 48b. In accordance with on aspect, each air channel 28a, 28b may include an optional a vane box (not shown) that includes at least one vane (not shown). Each vane box can be disposed near the lateral edges 48a, 48b of the outer body 22 and rearward of the actuatable panels 50a, 50b. The position of the optional vane boxes are selected to not interfere with movement of the first and second actuatable panels 50a, 50b.

Referring to FIGS. 6-8, one or more actuatable panels 50a, 50b are configured to move between a plurality of different positions P1-P3 with respect to the central body 26. The actuatable assembly 76 controls movement of the actuatable panels 50a, 50b between the different positions as further explained below. The different positions of the actuatable panels 50a, 50b may control the direction of air flow through and/or around the fairing 20.

In accordance with the illustrated aspect as shown FIG. 8, the actuatable panels 50a, 50b are pivotably coupled to the sides 38, 40 via couplings (not shown). The couplings may be hinged couplings or the like and are located along the inner surface of the outer body 22. The couplings can define respective pivot axes A1, A2, about which the actuatable panels 50a, 50b can pivot. In alternative aspects, the actuatable panels 50a, 50b can be coupled to the outer body 22 to pivot about a first pivot axis A1, A2 and a second pivot axis (not shown) that is perpendicular to the first pivot axis A1, A2, such that the actuatable panels have two degrees of freedom of movement. In still another alternative aspect, the actuatable panels 50a, 50b can be coupled to the outer body so as to pivot about a first pivot axis, a second pivot axis (not shown) that is perpendicular to the first pivot axis, and a third pivot axis that is perpendicular to the first pivot axis and the second pivot axis. In such an aspect, the actuatable panels have three degrees of freedom of movement.

Continuing with FIG. 8, as noted above, the actuatable panels 50a, 50b can transition between a plurality of different positions P1-P3 about the pivot axis A1, A2. For instance, the actuatable panels 50a, 50b may have a neutral position P1 (also called a first position), an inboard position P2 (also referred to as second position), and an outboard position P3 (also referred to as the third position). The inboard position P2 and the outboard position P3 are shown in dashed lines in FIG. 8. In accordance with the illustrated aspect, the first and second actuatable panels 50a, 50b have a range of motion between the inboard position and the outboard position. In one aspect, the range of motion is the maximum range of travel of a point defined by the terminal end 52a, 52b travel along an arc ($\alpha$) centered at the respective pivot axis A1, A2. The range of motion/arc $\alpha$ can vary between 3° and 24°. In some cases, the range of motion can be greater than 24°. The range of motion is determined in part by the size of actuatable panel and the position of the central body 26, if present, etc.

As shown in FIGS. 6 and 8, the neutral position P1 is where the actuatable panels 50a, 50b are aligned with a wall 58 along the base 34. The neutral (or first) position is where the air channels 28a, 28b are not obstructed. In the neutral (or first) position, the actuatable panels 50a, 50b direct air flow along an inboard flow path through the air channels 28a, 28b.

Referring to FIG. 8, the inboard position P2 is where the actuatable panels 50a, 50b have pivoted inward to at least partially (e.g. completely) obstruct the air channels 28a, 28b. For instance, in the inboard position P2, the actuatable panels 50a, 50b may be in contact with the central body 26. The air flow is directed along an outboard side 60a, 60b of the actuatable panels 50a, 50b and around the gap 8 of the truck 2.

As shown in FIG. 8, the outboard position P3 is where the actuatable panels 50a, 50b have pivoted outward in a direction away from the central body 26 as shown in FIG. 8. When the actuatable panels 50a, 50b are in the outboard position P3, the actuatable panels 50a, 50b can direct air flow into the air channels 28a and 28b along an inboard side of the panels 50a, 50b. FIGS. 7A and 7B illustrate the actuatable panel 50a in an outboard position P3.

The positions described herein and illustrated are exemplary. It should be appreciated that an actuation assembly 76 can cause the actuatable panels 50a, 50b to move between a range of positions that include the neutral position P1, the inboard position P2, and the outboard position P3. In other words, the actuatable panels 50a, 50b can move continuously through any defined range of motion about the pivot axis A1, A2 and may be temporarily fixed at any particular position throughout the entire range of motion of the actuatable panels 50a, 50b. Furthermore, the first and second actuatable panels 50a and 50b are independently movable to control air flow.

Continuing with FIG. 8, the fairing 20 includes actuation assembly 76 configured to move the actuatable panels 50a, 50b. In accordance with an aspect of the present disclosure, the actuation assembly 76 includes a first actuator 80a coupled to the roof or inner surface of the outer body 22 and a first coupler 82a that attaches the first actuator to the first panel 50a. The actuation assembly 76 also includes a second actuator 80b coupled to the roof or inner surface of the outer body 22 and a second coupler 82b that attaches the second actuator 80b to the second panel 50b. A wide variety of actuators can be used to cause movement of the actuatable panels 50a, 50b. For instance, the first and/or second actuator 80a, 80b may be a pneumatic actuator, an electro-magnetic actuator, an electric actuator, a hydraulic actuator, and the like. The first and second couplers 82a, 82b can be any linkage, assembly, or coupling of parts that can transfer motive force exerted by the first and second actuators into motion sufficient to cause the actuatable panels 50a and 50b to move into the desired positions. If a hydraulic actuator is utilized, the hydraulic actuator may include a hydraulic cylinder and a source of pressurized hydraulic fluid configured as a hydraulic system. If a pneumatic actuator is utilized, the pneumatic actuator may include a pneumatic cylinder and a source of pressurized pneumatic fluid configured as a pneumatic system. If an electro-magnetic actuator is utilized, the electro-magnetic actuator may include a solenoid and a source of electrical power to operate the solenoid configured as an electromagnetic system. Other implementations are contemplated as well.

Figure 9:
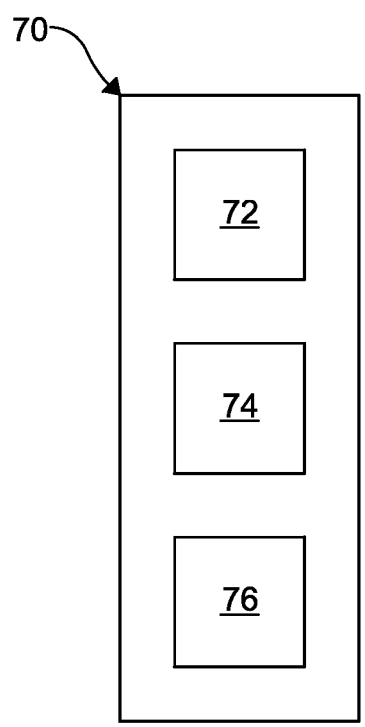
FIG. 9 is a schematic block diagram of a control system used to control operation of movable panels of the fairing shown in FIGS. 1-8.

FIG. 9 is a schematic block diagram illustrating a control system 70 that controls operation of the actuatable panels 50a, 50b according to one aspect of the present disclosure. The control system includes at least one sensor 72, for example a plurality of sensors, and at least one controller 74 communicatively coupled to the sensor(s) 72. The controller 74 is also coupled to the actuation assembly 76.

Continuing with FIG. 9, the sensors 72 are designed to obtain data that is indicative of the yaw direction of air flow impinging the truck 2 when in motion. Several different sensors may be used to obtain data indicative of yaw direction. In one example, the sensors may be one or more pressure sensors mounted to the fairing and/or the truck 2. In another example, the sensors 72 can be one or more anemometers. An anemometer can be use do determine wind direction, as well as other parameters. In one aspect, the anemometer may be a vane anemometer that may include a propeller and a tail on the same axis to obtain accurate and precise wind speed and direction measurements. In one aspect, the sensor may be a pitot-static system of pressure-sensitive instruments to determine an airspeed. A pitot-static system may include a pitot tube, a static port, and pitot-static instruments. In one aspect, the sensors may be an angle of attack sensor that senses the direction of local airflow. It is mounted on the truck 2 with the sensing probe extending therefrom. The sensing probe may be continually driven to null pressure differential between upper and lower slots in its forward surface. These features sense a direction of air stream flow. The angular position of the sensing probe may be converted to an electrical output by an angular sensor.

Still referring to FIG. 9, the controller 74 is used to control operation of the actuation assembly 76. The controller 74, or a plurality of controllers as needed, may include one or more processors, inputs, outputs, and communication modules for wired and/or wireless signal communications. The controller 74 may include control software that executes a series of instructions in response to obtaining data indicative of the yaw direction of air impinging the truck. The instructions, when executed by the processor (or several processors), initiate control signals that are transmitted to the actuation assembly 76. The control signals cause the actuation assembly 76 to actuate, or move, the actuatable panels 50a, 50b (FIG. 8) into the desired position relative to the central body 26. In one aspect, the controller 74 is configured to determine a yaw direction of air flow based on the data obtained from the sensor(s) 72. In response to the determination of the yaw direction of air flow, the controller 74 causes at least one of the first panel 50a and the second panel 50b to move into a selected position to direct air flow around and/or through the air channels 28a, 28b. Details of how the control system is used to control movement of panels 50a, 50b is provided below.

The controller 74 may include a processor. This processor may be operably connected to a power supply, a memory, a clock, an analog to digital converter (A/D), an input/output (I/O) port, and the like. The I/O port may be configured to receive signals from any suitably attached electronic device and forward these signals from the A/D and/or to processor. These signals include signals from the sensors 72. If the signals are in analog format, the signals may proceed via the A/D. In this regard, the A/D may be configured to receive analog format signals and convert these signals into corresponding digital format signals.

The controller 74 may include a digital to analog converter (DAC) that may be configured to receive digital format signals from the processor, convert these signals to analog format, and forward the analog signals from the I/O port. In this manner, electronic devices configured to utilize analog signals may receive communications or be driven by the processor. The processor may be configured to receive and transmit signals to and from the DAC, A/D and/or the I/O port. The processor may be further configured to receive time signals from the clock. In addition, the processor may be configured to store and retrieve electronic data to and from the memory. Finally, the processor may include a program stored in the memory executed by the processor to execute the process described herein.

The controller 74 and I/O port may be configured to control operation of the fairing 20 and receive signals from the sensors 72. The controller 74 may control operation the fairing 20 including the one or more actuation mechanisms 80a, 80b.

In accordance with aspects of the present disclosure, the fairing 20 and its components may be constructed of any rigid material which can be formed into the desired shape and provide the desired functions as described herein. In one example, the outer body 22 may comprise a metallic material, a polymeric material, laminate material, a composite material, or a combination comprising at least one of the foregoing. The outer body 22 may be a single sheet of material or a laminate of two more of the materials. In another example, the central body 26 may comprise a metallic material, a polymeric material, laminate material, a composite material, or a combination comprising at least one of the foregoing. The central body 26 may be a single sheet of material or a laminate of two more of the materials. In one aspect, the outer body 22 and the central body 26 may be formed from similar materials. It should be appreciated, however, that the outer body 22 and the central body 26 could be formed from different materials.

Exemplary polymer-based materials include polymeric materials, combinations of polymeric materials with elastomeric materials, and/or thermoset materials. In one aspect, the polymeric materials comprise thermoplastic polymeric materials. Possible thermoplastic polymeric materials include polybutylene terephthalate (PBT); acrylonitrile-butadiene-styrene (ABS) (CYCOLOY™ resins, commercially available from SABIC's Innovative Plastics business); polycarbonate (LEXAN™ and LEXAN™ EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC's Innovative Plastics business); blends of polycarbonate/PET/PBT; PBT and impact modifier (XENOY™ resins, commercially available from SABIC's Innovative Plastics business); polyamides (Nylon 6, Nylon 6-6, Nylon 6-9, Nylon 6-10, Nylon 6-12, Nylon 11, Nylon 12, Nylon 4-6, etc.); phenylene sulfide resins; polyvinyl chloride (PVC); high impact polystyrene (HIPS); polyolefins, e.g., low/high density polyethylene (L/HDPE), polypropylene (PP), expanded polypropylene (EPP); polyethylene (PE), thermoplastic olefins (TPO), as well as combinations comprising at least one of the foregoing.

Exemplary composites may be polyethylene (PE) and fiber composites; polypropylene and fiber composites (AZDEL Superlite™ sheets, commercially available from Azdel, Inc.); long fiber reinforced thermoplastics (VERTON™ resins, commercially available from SABIC's Innovative Plastics business); long glass fiber filled polypropylene resin (STAMAX™ resin also commercially available from SABIC's Innovative Plastics business), carbon fiber reinforced polymeric composites (CFRP), mineral fiber based composites, as well as combinations comprising at least one of the foregoing. Some possible reinforcing materials include fibers, such as glass, carbon, and so forth.

Various processes may be used to form the fairing 20 as described herein. For example, various molding processes can be used to make the fairing 20 including, but not limited to, injection molding, thermoforming, compression molding, additive manufacturing, etc. In one example, the outer body 22 and/or central body 26, and/or optional vane boxes can be thermoformed. In another example, the outer body 22, the central body 26, and/or optional vane boxes can be injection molded. In another example, the outer body 22 and/or central body 26, and/or optional vane boxes can be vacuum formed. In examples of fairings used for mid-cab or sleeper cabs where the footprint is relatively large, the outer body of the fairing 20 can be manufactured via thermoforming. In examples of fairings used for day-cabs where the footprint is relatively smaller, the outer body of the fairing 20 can be manufactured via injection molding.

The operation of the fairing 20 is described next. In operation, the fairing 20 can actively adjust aerodynamics when the truck 2 is in motion. As the truck is traveling in a forward direction, the control system 70 can control operation of the actuatable panels 50a, 50b based on the yaw direction of air impinging the truck 2. When the truck 2 is in motion, the sensors 72 obtain data indicative of the yaw direction of air flow impinging the truck 2. As noted above, a "0° yaw" direction is aligned with the truck centerline CL that is horizontal and parallel to the road surface. A positive yaw angle indicates a direction offset toward the right of the centerline CL. A negative yaw angle indicates a direction offset toward the left of the centerline CL.

In an aspect of the disclosure where pressure sensors are used, pressure readings may be used to determine a yaw direction of air flow impinging the truck 2. When the truck is in motion, the pressure readings obtained from the pressure sensors are transmitted to the controller 74. The controller 74 can determine the yaw direction relative the truck centerline CL based on measured pressure data, truck velocity, and truck direction of travel (such as its azimuth relative to the due north). In another example, a plurality of pressure sensors can be disposed at different locations on the truck 2 oriented with respect to the truck centerline CL. The controller 74 can receive data from the each sensor and determine an approximate yaw direction by comparing the magnitude of pressure readings obtained from the each pressure sensor. For instance, if the controller determines the pressure sensors positioned right of the centerline CL have higher pressure readings than those positioned to the left of the centerline CL, the controller determines that the yaw direction is toward the right of the centerline CL than the left of the centerline CL.

In another alternative aspect, the controller 74 can determine the pressure difference between two pressure ports connected to a single pressure sensor. In this case a differential pressure sensor is used and one side of the pressure sensor is exposed to a straight port, the second side is exposed to an angled port. The difference in pressure indicates the directionality of the wind impinging the fairing. In response to the determination, the controller 74 can direct one or more of the actuatable panels to move inwardly our outwardly as needed.

In an aspect of the disclosure where anemometers are used, readings from the anemometers concerning wind direction and wind velocity may be used to determine yaw direction of air flow impinging the truck 2. When the truck is in motion, the anemometer data is transmitted to the controller 74. The controller 74 can determine the yaw direction relative to the truck centerline CL based on the anemometer data (wind direction and velocity), truck velocity, and truck direction of travel (such as its azimuth relative to the due north).

After the yaw direction is determined (via pressure sensor data and/or anemometer data), the controller 74 can direct one or both of the actuatable panels 50a, 50b inward toward the inboard position P2 or outwardly toward outboard position P3 (see FIG. 8). If the controller 74 determines that the direction of air impinging the truck is at +6 yaw relative to centerline CL, the controller 74 may direct the right actuatable panel 50a outwardly and the left actuatable panel 50b inwardly. If the controller 74 determines that the direction of air impinging the truck is at −6° yaw relative to centerline CL, the controller 74 may direct the left actuatable panel 50b outwardly and the right actuatable panel 50a inwardly. In some instances, only one of the first and second actuatable panels 50a, 50b may be moved in response to the sensor data. For example, as shown in FIGS. 7A and 7B, if the controller 74 determines that the direction of air impinging the truck is at about a +6° yaw relative to centerline CL, the controller 74 may direct only the right actuatable panel 50a outwardly into the outboard position P3 and maintain the left actuatable panel 50b in the neutral position P1.

The fairings as disclosed here include at least the following aspects:

Aspect 1: A fairing configured to be positioned on a roof of a vehicle, the fairing having a forward end and a rearward end, the fairing comprising:

a flow controlling outer body defining a central forward opening;

at least one actuatable panel movably coupled to the flow controlling outer body;

a central body aligned with the central forward opening of the flow controlling outer body;

at least one air channel open to the central forward opening that extends between the at least one actuatable panel and the central body; and at least one actuator configured to move the at least one actuatable panel through a plurality of positions to direct an air flow along at least one of 1) the at least one air channel and 2) an outboard side of the at least one actuatable panel.

Aspect 2: The fairing system of claim 1, further comprising at least one sensor configured to obtain data indicative of a direction of air flow impinging the fairing when the fairing is coupled to the vehicle.

Aspect 3: The fairing system of aspect 2, wherein the at least one sensor is at least one pressure sensor.

Aspect 4: The fairing system of aspect 2, wherein the at least one sensor is at least one anemometer.

Aspect 5: The fairing system of aspect 2, further comprising at least one controller that is electronically coupled to the at least one actuator, wherein the at least one controller is configured to a) determine the direction of air flow based on the data obtained from the at least one sensor, and b) responsive to the determination of the direction of air flow, to cause the at least one actuatable panel to move between the plurality of positions to direct the air flow through the first flow path or the second flow path.

Aspect 6: The fairing system of aspect 1, wherein the plurality of positions is a first position where the at least one air channel is not obstructed and the air flow is directed along the first flow path through the at least one air channel, and a second position where the at least one air channel is obstructed and the air flow is directed along the second flow path outboard of the at least one actuatable panel.

Aspect 7: The fairing system of aspect 1, wherein the at least one actuatable panel is a first panel coupled to a first side of the outer body and a second panel coupled to a second side of the outer body.

Aspect 8: The fairing system of aspect 7, wherein the at least one actuator is a first actuator coupled to the first panel and a second actuator coupled to the second panel.

Aspect 9: The fairing system of aspect 8, further comprising:
a first coupler that attaches the first actuator to the first panel; and
a second coupler that attaches the second actuator to the second panel.

Aspect 10: The fairing system of aspect 1, wherein the at least one actuator is a pneumatic actuator.

Aspect 11: The fairing system of aspect 1, wherein the at least one actuator an electro-magnetic actuator.

Aspect 12: The fairing system of aspect 1, wherein the at least one actuator is an electric actuator.

Aspect 13: The fairing system of aspect 1, wherein the at least one actuatable panel is pivotably coupled to the outer body.

Aspect 14: The fairing system of aspect 1, wherein the at least one air channel includes a vane box that includes at least one vane.

Aspect 15: A fairing system for a roof of a vehicle, the fairing system comprising:
a flow controlling outer body defining a central forward opening;
at least one actuatable panel movably coupled to the flow controlling outer body;
a central body aligned with the central forward opening of the flow controlling outer body;
at least one air channel that extends between the at least one actuatable panel and the central body;
an actuation assembly that is configured to move the at least one actuatable panel with respect to the central body through a plurality of positions to direct an air flow;
at least one sensor configured to obtain data indicative of a direction of air flow impinging the fairing; and
a controller in communication with the at least one sensor and the actuation assembly, wherein
the at least one actuatable panel is a first panel and a second panel, and
the controller is configured to operate the actuation assembly so as to move at least one of the first panel and the second panel through their respective plurality of positions.

Aspect 16: The fairing system of aspect 15, wherein the at least one sensor is at least one pressure sensor.

Aspect 17: The fairing system of aspect 15, wherein the at least one sensor is at least one anemometer.

Aspect 18: The fairing system of aspect 15, wherein the actuation assembly includes a first actuator coupled to the first panel and a second actuator coupled to the second panel.

Aspect 19: The fairing system of aspect 18, wherein the actuation assembly includes a first coupler that attaches the first actuator to the first panel, and a second coupler that attaches the second actuator to the second panel.

Aspect 20: The fairing system of aspect 18, wherein each actuator is a pneumatic actuator.

Aspect 21: The fairing system of aspect 18, wherein each actuator an electro-magnetic actuator.

Aspect 22: The fairing system of aspect 18, wherein each actuator is an electric actuator.

Aspect 23: The fairing system of aspect 15, wherein each air channel includes a vane box that includes at least one vane.

While the disclosure is described herein using a limited number of aspects, these specific aspects are not intended to limit the scope of the disclosure as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed:

1. A fairing system configured to be positioned on a roof of a vehicle, the fairing system having a forward end and a rearward end, the fairing system comprising:
a flow controlling outer body defining a central forward opening;
at least a first actuatable panel and a second actuatable panel movably coupled to the flow controlling outer body, wherein the first actuatable panel is arranged on a first side of a central body and the second actuatable panel is separate from the first actuatable panel and arranged on a second side of the central body opposite the first side, and wherein the central body is aligned with the central forward opening of the flow controlling outer body;
at least a first air channel and a second air channel open to the central forward opening, the first air channel extending between the first actuatable panel and the central body and the second air channel extending between the second actuatable panel and the central body;
a first actuator configured to move the first actuatable panel through a plurality of positions to direct an air flow along at least one of 1) the first air channel and 2) an outboard side of the first actuatable panel; and
a second actuator configured to move the second actuatable panel through a plurality of positions to direct an air flow along at least one of 1) the second air channel and 2) an outboard side of the second actuatable panel.

2. The fairing system of claim 1, further comprising at least one sensor configured to obtain data indicative of a direction of air flow impinging the fairing system when the fairing system is coupled to the vehicle.

3. The fairing system of claim 2, wherein the at least one sensor is at least one pressure sensor.

4. The fairing system of claim 2, wherein the at least one sensor is at least one anemometer.

5. The fairing system of claim 2, further comprising at least one controller that is electronically coupled to the first or the second actuator, wherein the at least one controller is configured to a) determine the direction of air flow based on the data obtained from the at least one sensor, and b) responsive to the determination of the direction of air flow, to cause the first or the second actuatable panel to move between the plurality of positions to direct the air flow through a first flow path or a second flow path.

6. The fairing system of claim 1, wherein the plurality of positions is a first position where the first air channel or the second air channel is not obstructed and the air flow is directed along a first flow path through the first air channel or the second air channel, and a second position where the first air channel or the second air channel is obstructed and the air flow is directed along a second flow path outboard of the first actuatable panel or the second actuatable panel.

7. The fairing system of claim 1, wherein the first actuatable panel and the second actuatable panel each comprise a first panel coupled to a first side of the outer body and a second panel coupled to a second side of the outer body.

8. The fairing system of claim 7, further comprising:
a first coupler that attaches the first actuator to the first panel; and a second coupler that attaches the second actuator to the second panel.

9. The fairing system of claim 1, wherein at least one of the first actuator and the second actuator is a pneumatic actuator.

10. The fairing system of claim 1, wherein at least one of the first actuator and the second actuator is an electro-magnetic actuator.

11. The fairing system of claim 1, wherein at least one of the first actuator and the second actuator is an electric actuator.

12. The fairing system of claim 1, wherein at least one of the first actuatable panel and the second actuatable panel is pivotably coupled to the outer body.

13. A fairing system for a roof of a vehicle, the fairing system comprising:
   a flow controlling outer body defining a central forward opening;
   a first actuatable panel and a second actuatable panel movably coupled to the flow controlling outer body, wherein the first actuatable panel is arranged on a first side of a central body and the second actuatable panel is separate from the first actuatable panel and arranged on a second side of the central body opposite the first side, and wherein the central body is aligned with the central forward opening of the flow controlling outer body;
   at least a first air channel and a second air channel, the first air channel extending between the first actuatable panel and the central body and the second air channel extending between the second actuatable panel and the central body;
   an actuation assembly that is configured to move the first actuatable panel and the second actuatable panel with respect to the central body through a plurality of positions to direct an air flow;
   at least one sensor configured to obtain data indicative of a direction of air flow impinging the fairing; and
   a controller in communication with at least one sensor and the actuation assembly, wherein
   each of the first actuatable panel and the second actuatable panel comprise a first panel and a second panel, and
   the controller is configured to operate the actuation assembly so as to move at least one of the first panel and the second panel through their respective plurality of positions.

14. The fairing system of claim 13, wherein the at least one sensor is at least one pressure sensor.

15. The fairing system of claim 13, wherein the at least one sensor is at least one anemometer.

16. The fairing system of claim 13, wherein the actuation assembly includes a first coupler that attaches the first actuator to the first panel, and a second coupler that attaches the second actuator to the second panel.

17. The fairing system of claim 13, wherein each actuator is a pneumatic actuator, an electro-magnetic actuator, or an electric actuator.

* * * * *